April 10, 1934.     J. C. COULOMBE     1,954,347
DIFFERENTIAL
Filed March 1, 1933
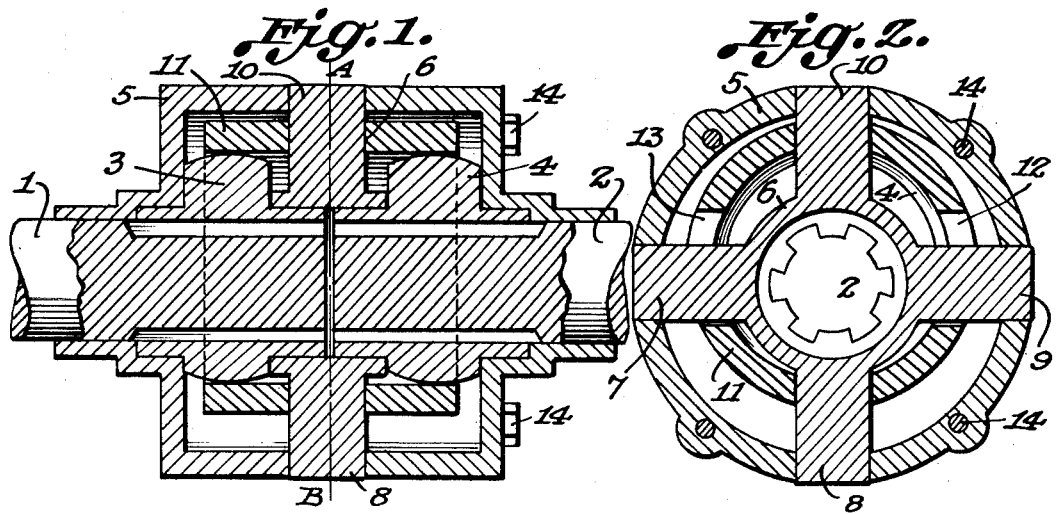
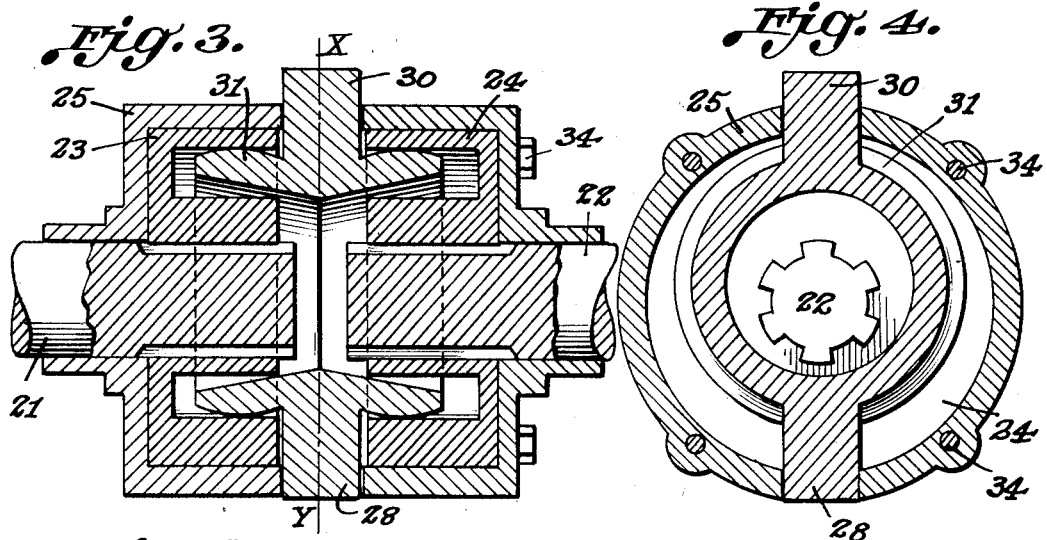
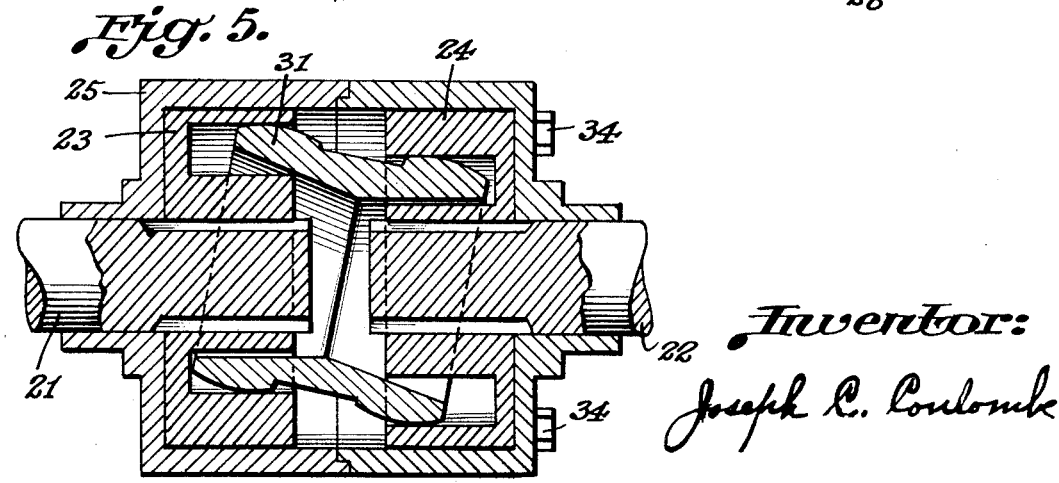
Inventor:
Joseph C. Coulombe Patented Apr. 10, 1934

1,954,347

UNITED STATES PATENT OFFICE 1,954,347

DIFFERENTIAL

Joseph C. Coulombe, Del Mar, Calif.

Application March 1, 1933, Serial No. 659,044

3 Claims. (Cl. 74—7)

This invention relates to differentials of the eccentric type.

The invention has for its object to produce a gearless differential for automobiles and other uses that is simple, efficient and cheap to manufacture.

I obtain this object by providing two eccentrics, one on each axle shaft end and a gyrating member cooperating with the eccentrics and the differential housing.

My invention will be better understood by reference to the accompanying drawing in which:

Fig. 1 is a vertical longitudinal sectional view, illustrating the form using outside eccentrics.

Fig. 2 is a sectional view of Fig. 1, through line A—B.

Fig. 3 is a vertical longitudinal sectional view, illustrating the form using inside eccentrics.

Fig. 4 is a sectional view of Fig. 3, through line X—Y.

Fig. 5 is a longitudinal sectional view of Fig. 3 showing the eccentrics in opposite position relative to each other, at one quarter revolution from the position shown in Fig. 3, illustrating the extreme position of the gyrating action of the gyrating member.

The axle shafts 1 and 2 are splined to the two outside eccentrics 3 and 4, respectively. A spider is mounted in the housing 5, having a central portion 6 providing an outboard bearing for the two eccentrics. Spider arms 7, 8, 9 and 10 are secured to the housing. A tubular gyrating member 11 is operated by the two eccentrics near its two ends, its mid-section being pierced by the two arms 8 and 10, upon which it slides up and down and pivots in the gyrating motion imparted to it by the eccentrics. Clearance holes 12 and 13 are provided in the gyrating member 11 so that the arms 7 and 9 at no time come into contact with the gyrating member. The housing 5 is made in two parts and secured together by means of cap screws 14. The eccentrics are rounded on their ends and fit to the tubular gyrating member to form partial ball and socket joints to allow for the gyrating motion of the gyrating member 11.

In the form using the inside eccentrics, shown in Figs. 3 to 5, axle shafts 21 and 22 are splined to the two inside eccentrics 23 and 24, respectively, whose outer surfaces are arranged for bearing fits within the housing 25. A tubular gyrating member 31 is operated by the two inside eccentrics near its ends, its mid-section having diametrically opposed pins 28 and 30 slidably mounted in and through the walls of housing 25. The housing 25 is made in two parts and secured together by the cap screws 34. The outside ends of gyrating member 31 are rounded and fit to the inside eccentrics to form partial ball and socket joints to allow for the gyrating motion of the gyrating member 31. The gyrating member 31 is made tubular to allow clearance of other parts, the only operating contact surfaces being the outer rounded ends and the pins.

In operation, when the housing is rotated, the parts lock and drive both axle shafts. With axle shafts doing the driving, the parts also lock to drive the housing. One axle shaft may be rotated in one direction while the other axle shaft is rotated in the reverse direction. The angularity of the eccentric action may be designed so that the rotation of one axle shaft will transmit rotation to the other axle shaft in the reverse direction, as in the standard gear differential, or the angularity of the eccentric action may be designed so that the rotation of one axle shaft will not transmit rotation to the other axle shaft in a reverse direction, but will permit one to be rotated in one direction and the other to be rotated in the reverse direction, providing a self-locking differential, both axle shafts being driven by the housing regardless of whether one or both vehicle road wheels have traction.

While the outside eccentric form, shown in Figs. 1 and 2, appears simpler and cheaper, the inside eccentric form has the advantage of maintaining a better weight balance, or distribution of weight, around the axis of rotation through the various positions of the eccentrics and the gyrating member, for this reason the internal eccentric form is preferred for high speed vehicles.

It will be understood that numerous details of construction may be altered or omitted and modifications made without departing from the spirit of this invention as defined by the following claims.

I claim:

1. In a differential mechanism, two aligned driven members, a driving member co-axial therewith, each of the driven members having on the end adjacent to the driving member an annular eccentric recess, a gyrating member having its mid-section operated by said driving member and its end sections operated by the said annular eccentric recesses.

2. In a differential mechanism, a driven member, a driving member co-axial therewith, an eccentric recess in the end of said driven member and a hollow gyrating member connecting said driving member with said eccentric recess.

3. In a differential mechanism, a driving member, a driven shaft co-axial therewith, an enlargement on the end of said driven shaft, an eccentric recess on the end face of said enlargement, said eccentric recess having a larger diameter than said driven shaft and extending clear around the center line of said driven shaft, and a gyrating member connecting said eccentric recess with said driving member.

JOSEPH C. COULOMBE.